United States Patent
Ito et al.

[11] Patent Number: 6,004,502
[45] Date of Patent: Dec. 21, 1999

[54] METHOD OF FIRING CERAMIC HONEYCOMB STRUCTURAL BODIES

[75] Inventors: Yasuhiro Ito, Nagoya; Wataru Kotani, Kasugai, both of Japan

[73] Assignee: NGK Insulators, Ltd., Japan

[21] Appl. No.: 09/137,511

[22] Filed: Aug. 20, 1998

[30] Foreign Application Priority Data

Sep. 2, 1997 [JP] Japan ................. 9-236960

[51] Int. Cl.⁶ .................................................. B28B 21/52
[52] U.S. Cl. ................................. 264/631; 264/630
[58] Field of Search ..................... 264/630, 631

[56] References Cited

U.S. PATENT DOCUMENTS

| | | | |
|---|---|---|---|
| 3,790,654 | 2/1974 | Bagley | 264/630 |
| 4,959,338 | 9/1990 | Miura et al. | 502/263 |
| 5,046,946 | 9/1991 | Yasuda et al. | 264/631 |
| 5,262,102 | 11/1993 | Wada | 264/631 |
| 5,725,829 | 3/1998 | Miyahara et al. | 264/630 |

FOREIGN PATENT DOCUMENTS

| | | |
|---|---|---|
| 1-249665 | 10/1989 | Japan . |
| 2-255576 | 10/1990 | Japan . |
| 5-85856 | 4/1993 | Japan . |

*Primary Examiner*—Christopher A. Fiorilla
*Attorney, Agent, or Firm*—Parkhurst & Wendel, L.L.P.

[57] ABSTRACT

A method of firing ceramic honeycomb structural bodies, in which cordierite raw materials including at least raw kaolin is extruded to obtain a honeycomb structural formed body and the thus obtained honeycomb structural formed body is fired. The method includes the step of firing a honeycomb structural body having a rib thickness of not more than 4.6 mil under such a condition that a temperature ascending rate during 400–600° C. is maintained under 70° C./hr. As a preferred embodiment, a temperature ascending rate during 400–600° C. is defined as under 70° C./hr in the case of manufacturing a honeycomb structural body having a rib thickness of 4.6–4.0 mil, or, a temperature ascending rate during 400–600° C. is defined as under 40° C./hr in the case of manufacturing a honeycomb structural body having a rib thickness of 3.9–2.0 mil.

6 Claims, No Drawings

METHOD OF FIRING CERAMIC HONEYCOMB STRUCTURAL BODIES

BACKGROUND OF THE INVENTION

1. Field of the Invention

The present invention relates to a method of firing ceramic honeycomb structural bodies, in which cordierite raw materials including at least raw kaolin is extruded to obtain a honeycomb structural formed body and the thus obtained honeycomb structural body is fired.

2. Description of Related Art

Generally, as a method of firing ceramic honeycomb structural bodies, in which cordierite raw materials including talc, kaolin, alumina and so on is extruded to obtain a honeycomb structural formed body and the thus obtained honeycomb structural body is fired, various firing methods have been known. For example, in Japanese Patent Laid-Open Publication No. 1-249665, in order to prevent a crack generation due to an exothermic reaction in a decomposition temperature range of forming agents, it has been known the technique that a temperature ascending rate till the forming agent decomposition temperature is decreased as compared with that of over the forming agent decomposition temperature. That is to say, in this technique, the firing is performed in such a manner that a temperature ascending rate till 200° C. is set to 80–90° C./hr and a temperature ascending rate of over that temperature is set to 100–120° C./hr.

Moreover, in Japanese Patent Laid-Open Publication No. 2-255576, in order to prevent a deformation of the ceramic honeycomb structural body, a temperature ascending rate is maintained under 60° C. in a temperature range (1100–1180° C.) in which the honeycomb structural body is shrunk by heat. Further, in Japanese Patent Laid-Open Publication No. 5-85856, in order to optimize the properties such as a water absorption rate and a thermal expansion coefficient rate, a temperature ascending rate is maintained (1) under 60° C./hr in a temperature range (1100–1200° C.) in which the honeycomb structural body is shrunk by heat, (2) over 80° C./hr in a solid phase reaction temperature range (1200–1300° C.), and (3) under 60° C./hr in a liquid phase reaction temperature range (1300-keep temperature).

On the other hand, as a carrier constructed by the honeycomb structural body used for purifying an exhaust gas from automobiles, it is necessary to increase a cell density so as to improve a purifying performance. In the honeycomb structural body, if the cell density is increased, a pressure loss is necessarily increased. Therefore, if the cell density is increased, an engine power is decreased. In order to reduce the pressure loss, it is necessary to make a rib thickness thinner. Generally, honeycomb structural bodies having a rib thickness of 6.0–6.6 mil, which are so-called as 6 mil body, are mainly used. However, recently, honeycomb structural bodies having a rib thickness of under 4.6 mil, which are so-called as thin wall body, are used increasingly.

When the thin wall honeycomb structural body having a rib thickness of under 4.6 mil is to be fired according to the known firing methods mentioned above, a crack is liable to be generated during the firing step as compared with the known honeycomb structural body having relatively thick wall thickness. Particularly, in order to obtain the honeycomb structural body having a thin wall thickness, a raw kaolin is used recently as a part of kaolin so as to improve a flowability of raw materials when they are passed through the die. In this case, since a crystallization water is removed from the raw kaolin at a temperature of 400–600° C. and this crystallization water removing reaction is a heat absorbing reaction, a temperature difference is generated in the honeycomb structural body during this heat absorbing reaction, so that a crack is liable to be generated in the honeycomb structural body.

SUMMARY OF THE INVENTION

It is an object of the present invention to eliminate the drawbacks mentioned above and to provide a method of firing ceramic honeycomb structural bodies, in which a crack is not generated during a firing step in a honeycomb structural body having a thin wall thickness even if a raw kaolin is used as cordierite raw materials.

According to the invention, a method of firing ceramic honeycomb structural bodies, in which cordierite raw materials including at least raw kaolin is extruded to obtain a honeycomb structural formed body and the thus obtained honeycomb structural formed body is fired, comprises the step of: firing a honeycomb structural body having a rib thickness of not more than 4.6 mil under such a condition that a temperature ascending rate during 400–600° C. is maintained under 70° C./hr.

In the construction mentioned above, a temperature ascending rate is defined as under 70° C./hr in the temperature range of 400–600° C. in which a crystallization water is removed from raw kaolin. Therefore, even if the ceramic honeycomb structural body having a rib thickness of under 4.6 mil is fired by using raw kaolin as cordierite raw materials, a crack generation does not occur.

Moreover, in the present invention, it is preferred that a temperature ascending rate is defined as under 60° C./hr in the temperature range of 400–600° C. when the ceramic honeycomb structural body having a rib thickness of 4.6–4.0 mil is to be fired. This is because a crack generation can be effectively eliminated. In this preferred embodiment, if a temperature ascending rate during 400–500° C. is defined as under 60° C./hr and a temperature ascending rate during 500–600° C./hr is defined as a larger temperature ascending rate than that during 400–500° C., a sufficient water removing reaction in raw kaolin can be performed since a temperature ascending rate during 500–600° C. can be improved. Further, in this preferred embodiment, if an additional amount of raw kaolin is defined as over 30% with respect to the total kaolin amount in the cordierite raw materials, a sufficient form maintaining performance can be obtained in the formed body and thus a deformation failure generation rate of the formed body can be decreased preferably.

Furthermore, in the present invention, it is preferred that a temperature ascending rate is defined as under 40° C./hr in the temperature range of 400–600° C. when the ceramic honeycomb structural body having a rib thickness of 3.9–2.0 mil is to be fired. This is because a crack generation can be effectively eliminated. In this preferred embodiment, if a temperature ascending rate during 400–500° C. is defined as under 30° C./hr and a temperature ascending rate during 500–600° C./hr is defined as a larger temperature ascending rate than that during 400–500° C., a sufficient water removing reaction in raw kaolin can be performed since a temperature ascending rate during 500–600° C. can be improved. Further, in this preferred embodiment, if an additional amount of raw kaolin is defined as over 40% with respect to the total kaolin amount in the cordierite raw materials, a sufficient formability can be obtained in the formed body and thus a deformation failure generation rate of the formed body can be decreased preferably.

In this embodiment, if a temperature ascending rate is smaller than an upper limit thereof, a crack generation does not occur. Therefore, a particular lower limit of the temperature ascending rate is not defined. However, if a temperature ascending rate becomes lower, a total firing time becomes longer correspondingly. Therefore, from a viewpoint of production efficiency, it is preferred to perform a firing at a temperature ascending rate near the upper limit thereof. Moreover, in the present invention, a unit "mil" means a thickness and 1 mil corresponds to 25.4 μm.

DESCRIPTION OF THE PREFERRED EMBODIMENT

Hereinafter, a method of firing ceramic honeycomb structural bodies according to the invention will be explained. At first, fine talc, kaolin, alumina and the other cordierite generation raw materials are mixed to obtain a mixture, a composition of which lies in a range of SiO: 42–56 wt %, $Al_2O_3$: 30–45 wt %, and MgO: 12–16 wt % showing a cordierite theoretical chemical composition of $2MgO.2Al_2O_3.5SiO_2$. Then, forming agents and/or poring agents are added to the mixture, and the thus obtained mixture is extruded to obtain a formed body. Then, the formed body is dried up to obtain a ceramic honeycomb formed body.

In this case, it is preferred to set an additional amount of raw kaolin over 30% with respect to a total kaolin amount in cordierite raw materials when a honeycomb structural body having a rib thickness of 4.6–4.0 mil is to be formed and also it is preferred to set an additional amount of raw kaolin over 40% with respect to a total kaolin amount in cordierite raw materials when a honeycomb structural body having a rib thickness of 3.9–2.0 mil is to be formed. These reasons are as follows. That is to say, it is necessary to narrow a slit width of die used for extruding so as to make a rib thickness thin. If the slit width is narrow, a pressure loss becomes larger and thus a forming rate is decreased. In order to increase the forming rate, one idea, such that a water component in a ceramic batch is increased, is known. However, in such a case, since the ceramic honeycomb formed body extruded through slits of the die has not a sufficient form maintaining performance, the ceramic honeycomb formed body is liable to be deformed by its own weight. In order to prevent such a deformation, we find that it is effective to increase an additional amount of raw kaolin with respect to a total kaolin amount in cordierite raw materials. Therefore, in the case that an additional amount of raw kaolin is increase as mentioned above, a sufficient flowability can be obtained even if a water component in the batch is not so increased.

Moreover, if all of or a part of alumina serving as a supply source of alumina component in cordierite raw materials is substituted by aluminum hydroxide, a thermal expansion coefficient of the honeycomb structural body can be decreased, and thus this is a preferred embodiment.

Further, as a fine talc to be used, it is preferred to use a fine talc including particularly low alkali component. Moreover, in order to make particle sizes of talc and kaolin fine, it is preferred to use a calcined talc which is effective for preventing a crack generation of the honeycomb structural body due to a shrinkage during drying and firing steps. In this case, it is preferred to use a calcined talc having the same fine particle size as that of raw materials. As the forming agents, (1) organic binders such as methyl cellulose, carboxymethyl cellulose, polyvinyl alcohol, starchy paste, flour, glycerin, (2) surface-active agents, and (3) wax are used selectively for its purpose. Moreover, as the poring agents, graphite, starch and sawdust are used selectively for its purpose.

After that, when the thus obtained ceramic honeycomb structural body is fired, it is preferred to control a temperature ascending rate as follows. In one preferred embodiment, a temperature ascending rate during 400–600° C. is defined as under 70° C./hr, when the honeycomb structural body having a rib thickness of 4.6–4.0 mil is to be fired. In the another preferred embodiment, a temperature ascending rate during 400–600° C. is defined as under 40° C./hr, when the honeycomb structural body having a rib thickness of 3.9–2.0 mil is to be fired. In the temperature regions other than the above mentioned temperature range, the same temperature ascending rate as that of the known firing method can be used.

Moreover, in the further another preferred embodiment, a temperature ascending rate during 400–500° C. is defined as under 60° C./hr and a temperature ascending rate during 500–600° C. is defined as a larger temperature ascending rate than that during 400–500° C. Further, in another preferred embodiment, a temperature ascending rate during 400–500° C. is defined as under 30° C./hr and a temperature ascending rate during 500–600° C. is defined as a larger temperature ascending rate than that during 400–500° C.

In the preferred embodiment of the thin wall honeycomb structural body which is a manufacturing object of the invention, a temperature ascending rate for the honeycomb structural body having a rib thickness of 4.6–4.0 mil is different from that for the honeycomb structural body having a rib thickness of 3.9–2.0 mil. This is because an amount of raw kaolin required for manufacturing the thin wall honeycomb structural bodies having respective rib thickness is different. That is to say, it is necessary to increase an amount of raw kaolin if a rib thickness becomes thinner.

Then, actual experiments will be explained. Hereinafter, in an experiment 1, a temperature ascending rate during 400–600° C. is varied to investigate a crack generation rate. Moreover, in an experiment 2, as a preferred embodiment, a relation between formability and additional amount of raw kaolin is investigated.

Experiment 1

According to the method mentioned above, as shown in the following Table 1 and Table 2, ceramic raw materials such as kaolin including a predetermined amount of raw kaolin, talc, and alumina raw materials were prepared and mixed to obtain a mixture having a cordierite chemical composition. Then, methyl cellulose was added in the thus obtained mixture as a forming agent to obtain a plasticized mixture. Then, the thus obtained plasticized mixture was extruded and dried up to prepare a ceramic honeycomb formed body. All the prepared ceramic honeycomb formed bodies had the same dimension such as an elliptical shape having long diameter: 180 mm×short diameter: 120 mm×length: 100 mm. Then, the thus prepared ceramic honeycomb formed bodies were fired according to a predetermined heat curve in a firing furnace. Then, a percentage of the ceramic honeycomb structural bodies in which a crack was generated after the firing was calculated, and an estimation was performed on the basis of the thus calculated result. The firing was performed in such a manner that a temperature ascending rate in a temperature range of 400–600° C. was varied as shown in the Following Table 1 and Table 2. The results were also shown in Table 1 and Table 2. In Table 1 and Table 2, the estimation was performed as follows; a symbol "◯": usable and a symbol "x": unusable.

TABLE 1

| Rib thickness after firing (mil) | 4.6 | | | | 4.0 | | | |
|---|---|---|---|---|---|---|---|---|
| Percentage of raw kaolin amount with respect to total kaolin amount (%) | 30 | | | | 35 | | | |
| Temperature ascending rate during 400–500° C. (° C./hr) | 80 | 70 | 60 | 60 | 70 | 60 | 50 | 40 |
| Temperature ascending rate during 500–600° C. (° C./hr) | 80 | 70 | 60 | 70 | 70 | 60 | 50 | 50 |
| Firing crack generation rate (%) | 4.0 | 0.5 | 0.0 | 0.2 | 5.0 | 0.4 | 0.0 | 0.2 |
| Estimation | x | ○ | ○ | ○ | x | ○ | ○ | ○ |

TABLE 2

| Rib thickness after firing (mil) | 3.9 | | | | 3.5 | | | | 3.0 | | | | 2.0 | | | |
|---|---|---|---|---|---|---|---|---|---|---|---|---|---|---|---|---|
| Percentage of raw kaolin amount with respect to total kaolin amount (%) | 40 | | | | 40 | | | | 40 | | | | 45 | | | |
| Temperature ascending rate during 400–500° C. (° C./hr) | 50 | 40 | 30 | 30 | 50 | 40 | 30 | 30 | 40 | 30 | 20 | 20 | 35 | 25 | 15 | 15 |
| Temperature ascending rate during 500–600° C. (° C./hr) | 50 | 40 | 30 | 40 | 50 | 40 | 30 | 40 | 40 | 30 | 20 | 30 | 35 | 25 | 15 | 25 |
| Firing crack generation rate (%) | 3.0 | 0.3 | 0.0 | 0.1 | 6.0 | 0.7 | 0.0 | 0.1 | 5.0 | 0.6 | 0.0 | 0.1 | 5.0 | 0.6 | 0.2 | 0.2 |
| Estimation | x | ○ | ○ | ○ | x | ○ | ○ | ○ | x | ○ | ○ | ○ | x | ○ | ○ | ○ |

From the results shown in Table 1 and Table 2, it is understood that a thin wall ceramic honeycomb structural body having a rib thickness under 4.6 mil, in which no crack is generated, can be obtained by defining a temperature ascending rate in a temperature range of 400–600° C. as under 70° C./hr in which a crystallization water is removed from raw kaolin, even if a firing is performed by using raw kaolin as cordierite raw materials.

Moreover, from the results shown in Table 1, it is understood that it is preferred to define a temperature ascending rate in a temperature range of 400–600° C. as under 70° C./hr in the case of manufacturing the honeycomb structural body having a rib thickness of 4.6–4.0 mil. Further, it is understood that a temperature ascending rate during 500–600° C. can be increased while a crack generation rate is maintained at a low level, if a temperature ascending rate in a temperature range of 400–500° C. is defined as under 60° C./hr, and thus a production efficiency can be improved. We think this is because a sufficient water removing reaction can be performed by decreasing a temperature ascending rate during 400–500° C.

Further, from the results shown in Table 2, it is understood that it is necessary to define a temperature ascending rate in a temperature range of 400–600° C. as under 40° C./hr in the case of manufacturing the honeycomb structural body having a rib thickness of 3.9–2.0 mil. Moreover, as is the same as the results shown in Table 1, it is understood that a temperature ascending rate during 500–600° C. can be increased while a crack generation rate is maintained at a low level, if a temperature ascending rate in a temperature range of 400–500° C. is defined as under 30° C./hr, and thus a production efficiency can be improved.

Experiment 2

As is the same as the experiment 1, ceramic honeycomb formed bodies each having a predetermined amount of raw kaolin in which a rib thickness was varied respectively as shown in the following Table 3 and Table 4. Then, a percentage of the ceramic honeycomb formed bodies in which a deformation failure occurred during the forming step, and then an estimation was performed on the basis of the results. In Table 3 and Table 4, the estimation was performed as follows; a symbol "○": usable and a symbol "x": unusable.

TABLE 3

| Rib thickness after firing (mil) | 4.6 | | | | 4.0 | | | |
|---|---|---|---|---|---|---|---|---|
| Percentage of raw kaolin amount with respect to total kaolin amount in raw material powders (%) | 20 | 30 | 40 | 50 | 25 | 35 | 45 | 55 |
| Deformation failure generation rate during forming (%) | 15 | 0.5 | 0.3 | 0.2 | 17 | 0.6 | 0.4 | 0.1 |
| Estimation | x | ○ | ○ | ○ | x | ○ | ○ | ○ |

TABLE 4

| Rib thickness after firing (mil) | 3.9 | | | | 3.5 | | | | 3.0 | | | | 2.0 | | | |
|---|---|---|---|---|---|---|---|---|---|---|---|---|---|---|---|---|
| Percentage of raw kaolin amount with respect to total kaolin amount in raw material powders (%) | 30 | 40 | 50 | 60 | 30 | 40 | 50 | 60 | 35 | 45 | 55 | 65 | 40 | 50 | 60 | 70 |
| Deformation failure generation rate during forming (%) | 4 | 0.4 | 0.3 | 0.1 | 23 | 0.7 | 0.5 | 0.2 | 18 | 0.4 | 0.3 | 0.1 | 8.7 | 0.7 | 0.4 | 0.3 |
| Estimation | x | ○ | ○ | ○ | x | ○ | ○ | ○ | x | ○ | ○ | ○ | x | ○ | ○ | ○ |

From the results shown in Table 3, it is understood that it is preferred to define a percentage of raw kaolin amount with respect to a total kaolin amount in raw material powders as over 30% in the case of manufacturing the honeycomb structural body having a rib thickness of 4.6–4.0 mil. Moreover, from the results shown in Table 4, it is understood that it is preferred to define a percentage of raw kaolin amount with respect to a total kaolin amount in raw material powders as over 40% in the case of manufacturing the honeycomb structural body having a rib thickness of 3.9–2.0 mil.

As is clearly understood from the above explanations, according to the invention, it is possible to obtain a ceramic honeycomb structural body, in which no crack is generated during the firing step even if raw kaolin is used as cordierite raw materials, when a thin wall ceramic honeycomb structural body including at least raw kaolin as cordierite raw materials.

What is claimed:

1. A method of firing ceramic honeycomb structural bodies, in which cordierite raw materials comprising kaolin is extruded to obtain a honeycomb structural formed body and the honeycomb structural formed body is fired, comprising:

firing a honeycomb structural body having a rib thickness of not more than 4.6 mil under such a condition that a temperature ascending rate during 400–600° C. is maintained under 70° C./hr;

firing the honeycomb structural body under such a condition that the temperature ascending rate during 400–500° C. is maintained under 60° C./hr; and, firing the honeycomb structural body under such a condition that the temperature ascending rate during 500–600° C. is maintained at a temperature ascending rate larger than the rate maintained during the 400–500° C. firing.

2. The method according to claim 1, wherein an additional amount of the kaolin with respect to a total kaolin amount in the cordierite raw materials is not less than 30%.

3. The method according to claim 1, further comprising:

firing the honeycomb structural body having a rib thickness of 3.9–2.0 mil under such a condition that a temperature ascending rate during 400–600° C. is maintained under 40° C./hr.

4. The method according to claim 3, further comprising:

firing the honeycomb structural body under such a condition that a temperature ascending rate during 400–500° C. is maintained under 30° C./hr, and firing the honeycomb structural body under such a condition that a temperature ascending rate during 500–600° C. is maintained at a larger temperature ascending rate than the rate maintained during the 400–500° C. firing.

5. The method according to claim 3, wherein an additional amount of the raw kaolin with respect to a total kaolin amount in the cordierite raw materials is not less than 40%.

6. A method of firing ceramic honeycomb structural bodies, in which cordierite raw materials comprising kaolin is extruded to obtain a honeycomb structural formed body and the honeycomb structural formed body is fired, comprising:

firing a honeycomb structural body having a rib thickness of 4.0 to 4.6 mil under such a condition that a temperature ascending rate during 400–600° C. is maintained under 70° C./hr;

firing the honeycomb structural body under such a condition that the temperature ascending rate during 400–500° C. is maintained under 60° C./hr; and, firing the honeycomb structural body under such a condition that the temperature ascending rate during 500–600° C. is maintained at a temperature ascending rate larger than the rate maintained during the 400–500° C. firing.

* * * * *